(12) United States Patent  
Friedland et al.

(10) Patent No.: US 7,367,064 B1
(45) Date of Patent: May 6, 2008

(54) METHOD OF MAKING SELF-STICKING BIBS AND NOVEL BIB

(75) Inventors: Frank Friedland, Boca Raton, FL (US); Michael B. Chasan, Boca Raton, FL (US)

(73) Assignee: Napkleen LLC, Boca Raton, FL (US)

( * ) Notice: Subject to any disclaimer, the term of this patent is extended or adjusted under 35 U.S.C. 154(b) by 0 days.

(21) Appl. No.: 11/561,965

(22) Filed: Nov. 21, 2006

(51) Int. Cl.
*A41B 13/10* (2006.01)
*B32B 38/00* (2006.01)

(52) U.S. Cl. ............... 2/49.1; 2/49.4; 156/269; 156/209

(58) Field of Classification Search .............. 2/48, 2/49.1, 49.2, 49.4, 50, 51, 52, 49.3, 49.5; 156/247, 250, 253, 269, 199, 204, 209, 219, 156/290
See application file for complete search history.

(56) References Cited

U.S. PATENT DOCUMENTS

| 2,224,746 | A | | 12/1940 | Richstein |
| 2,424,680 | A | | 7/1947 | Doyle |
| 2,763,867 | A | * | 9/1956 | Chagnon ............... 2/49.1 |
| 2,803,574 | A | | 8/1957 | Payant |
| 3,146,465 | A | * | 9/1964 | Hummel ............... 2/49.3 |
| 3,221,341 | A | * | 12/1965 | Hummel ............... 2/48 |
| 3,329,969 | A | * | 7/1967 | Farber et al. .......... 2/49.3 |
| 3,619,816 | A | * | 11/1971 | Cowen ................ 2/48 |
| 3,675,274 | A | | 7/1972 | Fried et al. |
| 3,793,644 | A | | 2/1974 | Kellner |
| 4,306,316 | A | * | 12/1981 | Klepfer ............... 2/48 |
| 4,423,523 | A | | 1/1984 | Bodner et al. |
| 4,441,212 | A | | 4/1984 | Ahr et al. |
| 4,601,065 | A | | 7/1986 | Sigl et al. |
| 4,660,226 | A | * | 4/1987 | Quilling et al. ......... 2/49.2 |
| 4,779,288 | A | | 10/1988 | Mack |
| D299,282 | S | | 1/1989 | Winans |
| 4,977,626 | A | | 12/1990 | Smith |

(Continued)

FOREIGN PATENT DOCUMENTS

GB 993838 6/1965

(Continued)

OTHER PUBLICATIONS

Web-site www.graphicice.com/index.php?action=prodspec &itemID=39419.

*Primary Examiner*—A. Vanatta
(74) *Attorney, Agent, or Firm*—Martin Fleit; Paul D. Bianco; Fleit Kain Gibbons Gutman Bongini & Bianco P.L.

(57) ABSTRACT

A method of making bibs wherein an elongated web of absorbent paper is laminated with an elongated web of plastic film to form a laminated web by embossing the absorbent paper and heat sealing the embossed area with the plastic film. The embossed areas are in the form of an array of spaced areas of a predetermined geometry. A stripe of an adhesive is applied along an edge of the laminated web of absorbent paper and plastic film on the plastic film side thereof. The stripe of adhesive is covered with a release tape. The laminated web is severed transversely at predetermined longitudinal intervals to form individual bibs, which are collected.

18 Claims, 6 Drawing Sheets

U.S. PATENT DOCUMENTS

| | | |
|---|---|---|
| 4,995,641 A | 2/1991 | Landry et al. |
| 5,030,491 A | 7/1991 | Shoesmith |
| 5,033,620 A | 7/1991 | De Luca |
| 5,476,697 A | 12/1995 | Bellander |
| 5,552,200 A | 9/1996 | Gureff |
| 5,640,716 A | 6/1997 | Oldham |
| 5,672,056 A * | 9/1997 | Fisher et al. ............. 433/137 |
| 5,799,336 A | 9/1998 | Cooper |
| 5,875,490 A | 3/1999 | Woodard et al. |
| 6,000,056 A | 12/1999 | Brady et al. |
| 6,021,550 A | 2/2000 | Welch |
| 6,079,048 A | 6/2000 | Campbell |
| 6,212,683 B1 * | 4/2001 | Liebmann ................ 2/49.4 |
| 6,219,846 B1 | 4/2001 | Toole |
| 6,256,788 B1 * | 7/2001 | Loewer et al. ............ 2/49.2 |
| 6,342,297 B1 | 1/2002 | LaBrash |
| 6,493,879 B1 * | 12/2002 | Hibler ...................... 2/49.1 |
| 6,548,135 B1 | 4/2003 | Hershey et al. |
| 6,884,494 B1 * | 4/2005 | Curro et al. ............. 428/196 |
| 2002/0029400 A1 | 3/2002 | Smith |
| 2004/0224116 A1 | 11/2004 | Manasa |
| 2005/0144693 A1 | 7/2005 | Hagen |
| 2005/0269217 A1 | 12/2005 | Farmer |
| 2007/0006357 A1 | 1/2007 | Hall |
| 2007/0061938 A1 | 3/2007 | Reimer |
| 2007/0143904 A1 | 6/2007 | Brown |
| 2007/0199123 A1 | 8/2007 | Friedland et al. |
| 2007/0220651 A1 | 9/2007 | Friedland et al. |

FOREIGN PATENT DOCUMENTS

| | | |
|---|---|---|
| GB | 1095397 | 12/1967 |
| WO | WO 87/06105 | 10/1987 |

* cited by examiner

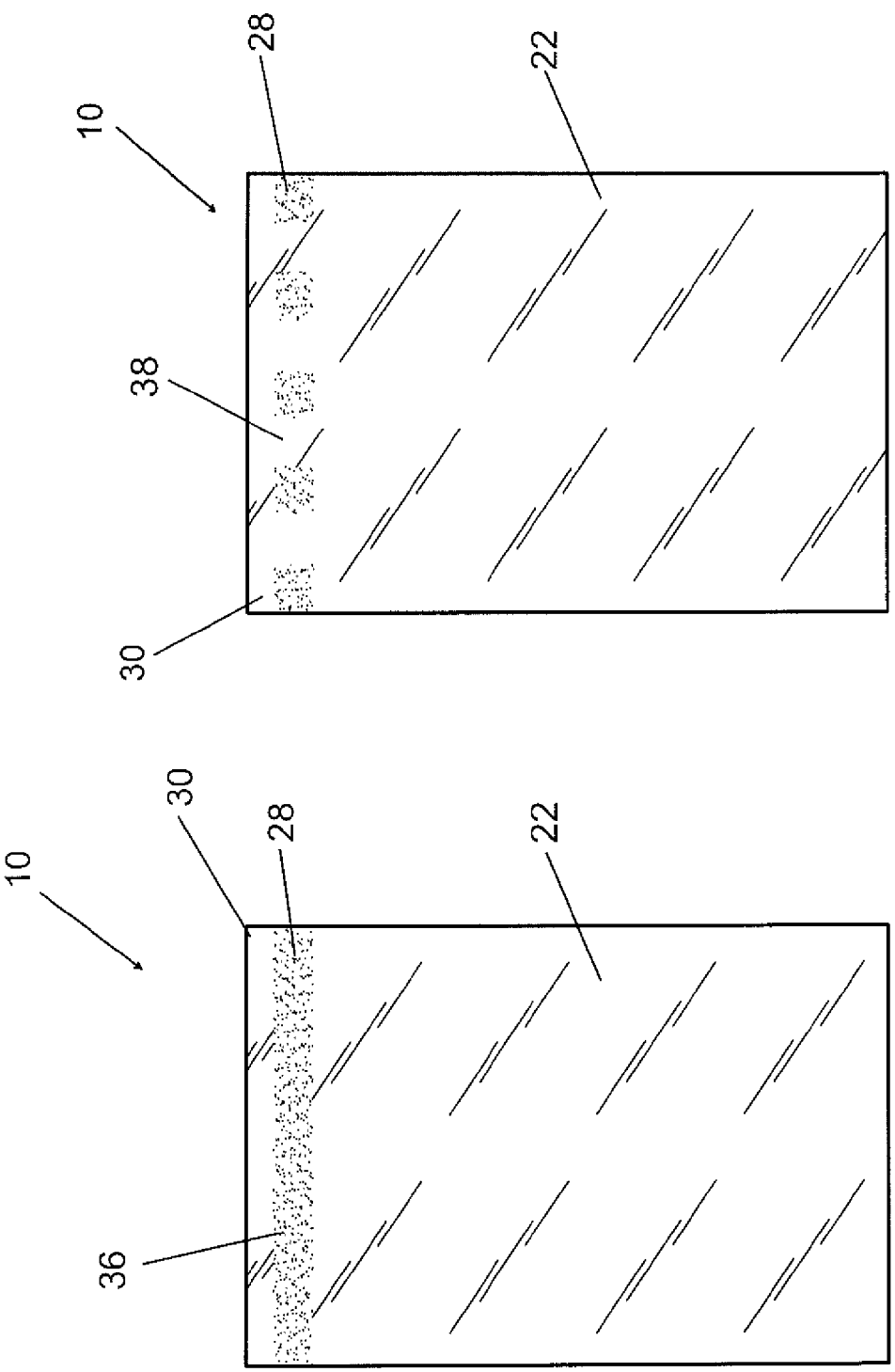

METHOD OF MAKING SELF-STICKING BIBS AND NOVEL BIB

BACKGROUND OF THE INVENTION

1. Field of the Invention

The present invention relates to method of making a self-sticking bib and a novel bib.

2. Prior Art

Bibs provided with an adhesive so they can be adhered to a wearer are known from the art. However, such known bibs have various drawbacks, particularly regarding how they are constructed and how they are made. The principal object of the present invention is to provide a novel method of making a novel self-sticking bib.

SUMMARY OF THE INVENTION

The invention relates to a method of making a self-sticking bib for protecting a wearer while eating or any other activity that could adversely affect the clothes of a wearer. The bib is particularly useful with young children and infants during feeding. The foregoing is accomplished by a method that consists of laminating a continuously running web of a plastic web, most preferably, a polyethylene film with a continuously running web of an absorbent paper web, most preferably, a cellular tissue paper, which previously has been printed with a printed decoration or motif. The lamination is effected by an embossing technique as a step of the method. The embossing is carried out so that an array of spaced depressions are made in the tissue web while heating the polyethylene film, so that an array of tissue portions of the tissue web are pressed into the heated film and adhered to the film, but the portions of the tissue web surrounding the pressed tissue portions, i.e. the unpressed portions, are left unaffected and therefore retain their original characteristics for absorption of liquids and other foods. The lamination is next followed by a step of applying, preferably by continuously spraying to the moving webs, a biocompatible adhesive or glue to one edge of the exposed polyethylene web in a longitudinal direction, i.e. the direction of travel of the web. The adhesive chosen is one that will adhere to clothes or human skin and yet be easily removed with slight pulling with no adverse effects to the clothes or the skin. Such adhesives are well known in the art. Next, the adhesive stripe applied to the web is covered with a removable sealing tape, a strip of suitable material so that the adhesive is not exposed and is fully covered and yet is easily removed. Such materials are well known for several applications, such as, self-sealing envelops or Telfa™ bandages. Finally, the moving laminated web is cut transversely at space intervals and the resulting cut pieces (now bibs) are stacked. In the preferred embodiment, the webs are 18 inches wide and cut at 13 inch intervals to produce bibs that are 13 inches wide and 18 inches long with the adhesive at the top edge of the bib on the polyethylene film side.

In an improvement of the above described method, the end of the bib opposite the adhesive and cover is folded up with the polyethylene side on the outside of the fold and the paper on the inside of the fold, and the edges of the folded up portion of the bib is heat sealed along each of the folded up edges to form a pocket in the bottom of the bib to catch any food that falls down on or adjacent to the bib while being worn by a user. The folded up portion can be from 1 to 4 inches deep to form a suitable pocket to catch the spills or droppings. The folding up of the lower portions of the bibs can take place before the bibs are cut at the transversely spaced intervals with the cutting and the heat sealing of the folded up edges occurring simultaneously. However, it is preferred that the heat sealing of the edges of the pockets takes place before the cutting into individual bibs. Also, the folding up and heat sealing of the folded up edges can occur after the bibs have been cut to size in a separate steps.

A further improvement consists of using webs that are a multiple of the length of the bib to be made, i.e. 2×, 3×, . . . n×, and the adhesive sprayed onto the polyethylene web at appropriate transverse locations across the longitudinally moving web corresponding to the top edges of the finished bibs. After applying the adhesive stripes and covering with a sealing tape or a strip of suitable material, the webs are cut at predetermined transverse intervals, such as 18 inches to create longitudinal sections that are bib wide. Thereafter, the cut web sections are either cut at longitudinal intervals, such as 13 inches or the cut webs are finished by folding to form pockets as described in the foregoing, heat sealed to perfect the pockets and cut at predetermined longitudinal intervals, such as 13 inches. In either case, the cut bibs are then stacked.

Other and further objects and advantages of the present invention will become more apparent form the following detailed descriptions of preferred embodiments of the invention when taken with the appended drawings.

BRIEF DESCRIPTION OF THE DRAWINGS

FIG. 3 shows the back side of a variation of the adhesive pattern of the bib shown in FIG. 1;

FIG. 4 shows the back side of another variation of the adhesive pattern of the bib shown in FIG. 1;

DETAILED DESCRIPTION OF PREFERRED EMBODIMENTS OF THE INVENTION

Figure 2:
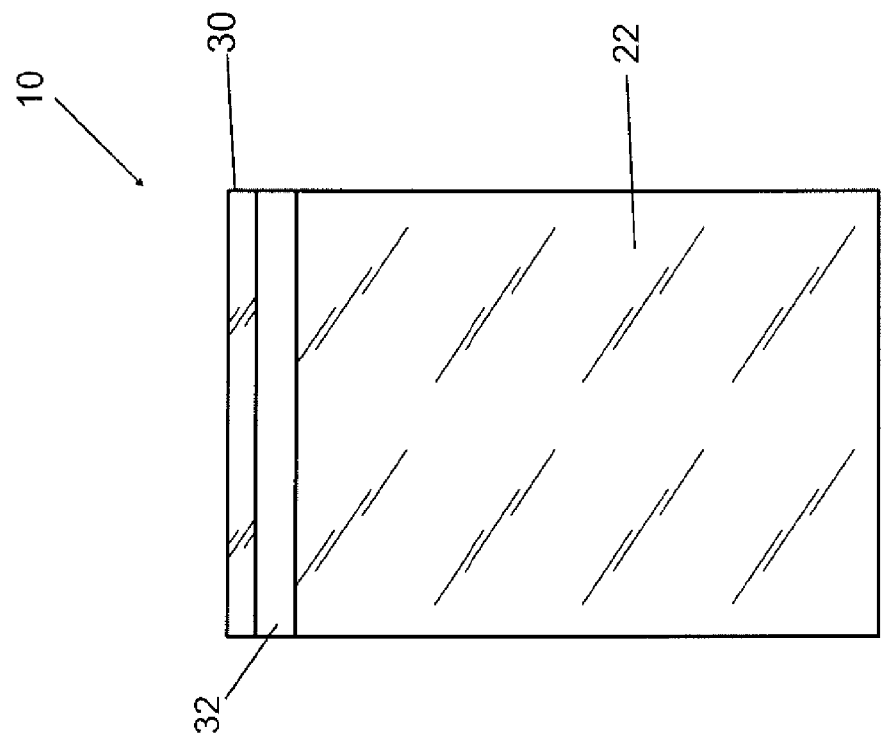
FIG. 2 shows the back side of the bib shown in FIG. 1.
Figure 1:
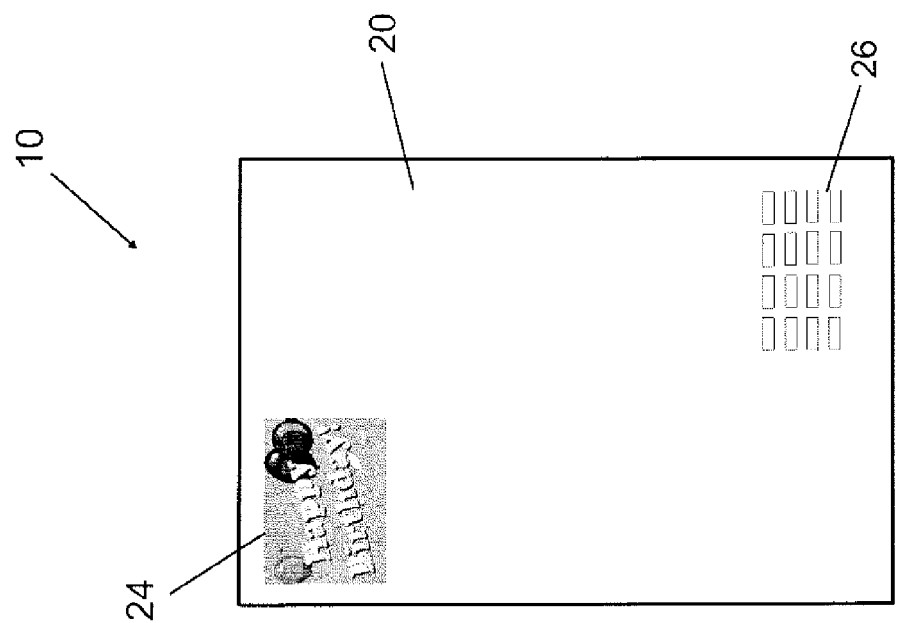
FIG. 1 shows the front side of a bib made according to the present invention.

Referring now to the drawings, preferred embodiments will now be described. In FIGS. 1 and 2 a bib 10 is shown consisting of a rectangular configuration composed of two overlying sheets of 19 gram cellular tissue 20 on the front side and polyethylene 22 on the rear side. The tissue 20 is imprinted with any suitable pattern or motif 24 and has been embossed with small rectangular depressions 26 that have been heat sealed to the polyethylene sheet 22. On the rear side of the bib, the polyethylene sheet 22 has an adhesive 28 coated along its top edge 30 covered with a release tape in the form of a removable cover strip 32, e.g. glassine paper. To use the bib, the cover strip 32 is removed and the bib 10 attached or stuck to the user by the adhesive 28. The cellular tissue sheet 20 is facing outwardly to catch and absorb any food or liquid that may spill. FIGS. 3 and 4 show alternative adhesive patterns for the adhesive 28. In FIG. 3, the adhesive is coated or sprayed on in a stippled pattern 36, whereas in FIG. 4 the adhesive 28 is coated or sprayed on at spaced horizontal or transverse intervals, as shown by reference numeral 38.

Figure 5:
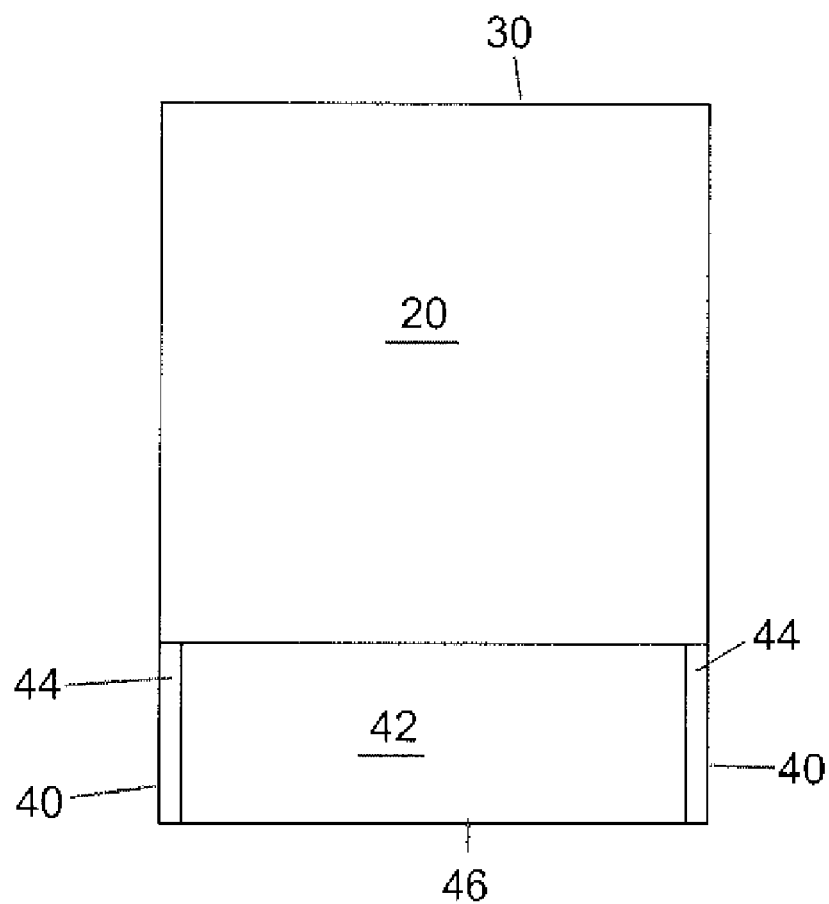
FIG. 5 shows the front side of a bib like that shown in FIG. 1, but with the bottom edge folded up to form a pocket at the bottom of the bib.
Figure 6:
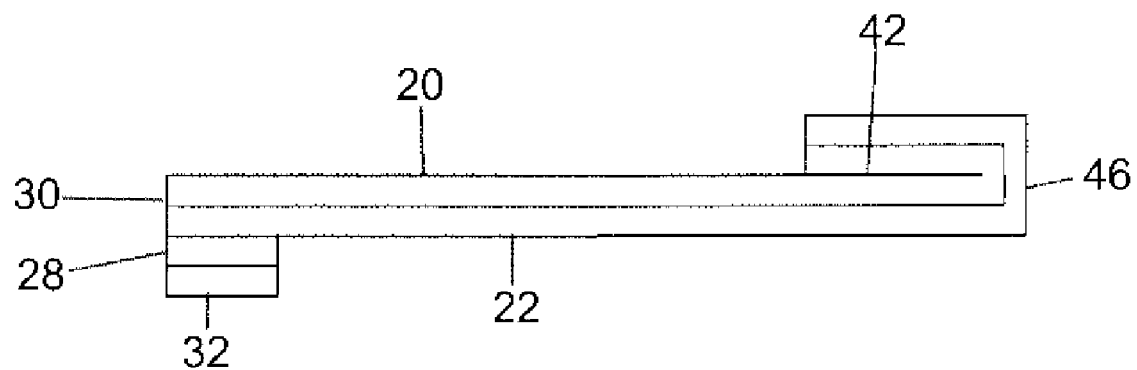
FIG. 6 shows a side view of the bib shown in FIG. 5.

In FIGS. 5 and 6 is shown a modified bib that is provided with a pocket at the bottom to aid in catching drippings. As shown the bib 10 has the same construction of a 19 gram cellular tissue sheet 20 on the front side and a polyethylene sheet 22 on the rear side. The top is finished as described with the adhesive 28 along the top edge 30 cover by strip 32 on the polyethylene sheet 22. At the bottom, the polyethylene sheet 22 is folded up and heat sealed at 44 along its folded up edges 40 to form a pocket 42 to catch foods or liquids. The fold is designated as reference numeral 46. By folding up in this manner, the cellular tissue is inside the pocket 42 to assist in containing spills.

Figure 7:
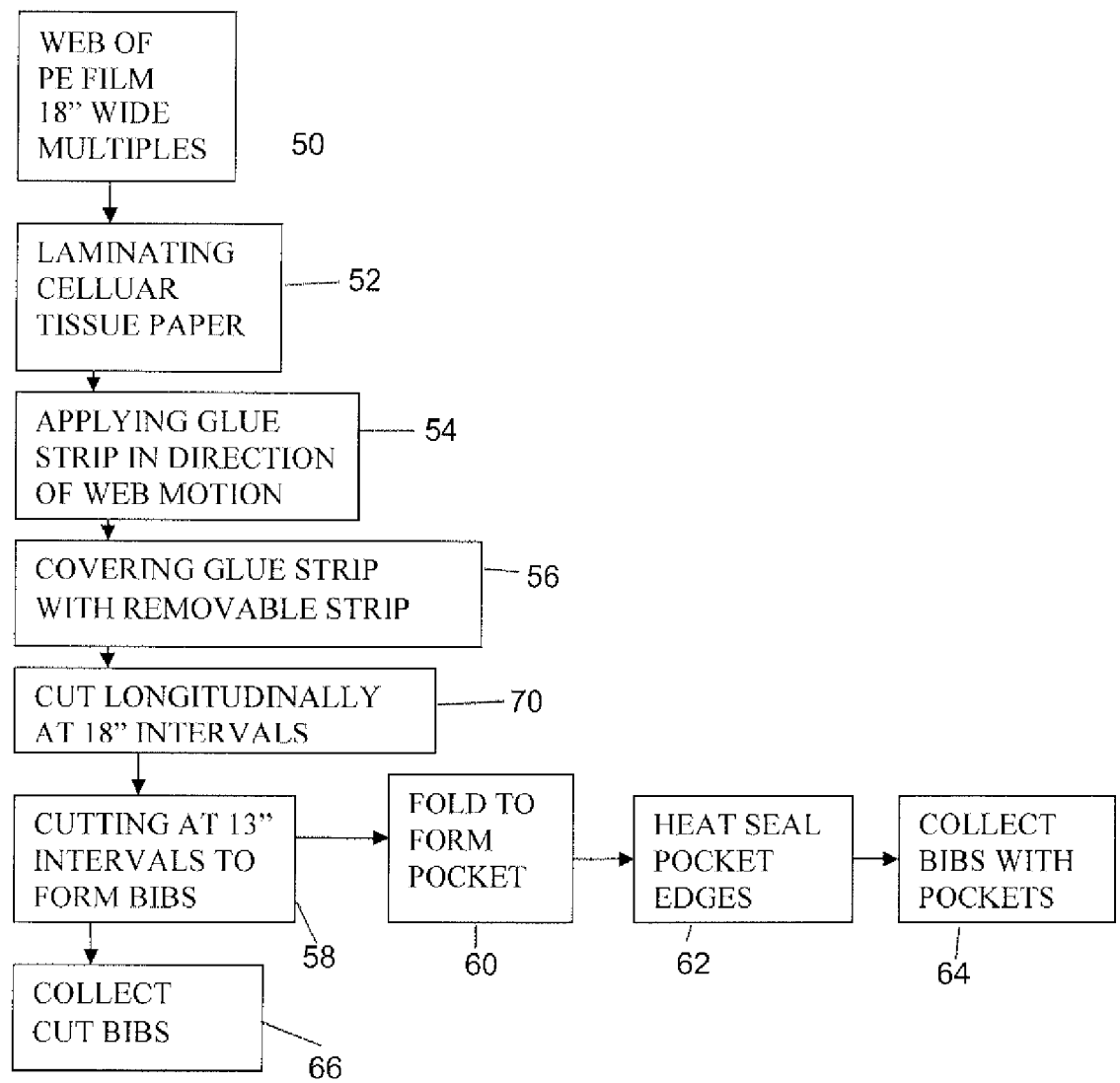
FIG. 7 shows in block diagram the method of making the bib shown in FIG. 1 and, alternatively shown in FIG. 5.

FIG. 7 shows a block diagram of the novel method of the present invention. In block 50 a web of polyethylene is fed to block 52 where it is laminated with a web of cellular tissue paper by a heated embossing cylinder that impressed an array of spaced small rectangular depressions into the tissue paper to heat seal the tissue paper to the polyethylene web. The depressions may have other geometry. The webs are a predetermined width, for example 18 inches. Next, the laminated web is fed to block 54 where a stripe of glue or adhesive is sprayed onto one edge of the laminated web on the polyethylene side as the web moves past the sprayer. Then, the stripe of glue is covered by a release tape as the web moves past the roll carrying the release tape in block 56. Next, in block 58, the laminated web is cut transversely at a predetermined longitudinal interval equivalent to the width of the finished bib, for example 13 inches. Finally, the cut bibs are then stacked in block 66. If a multiple of the bib length is used for a web, the longitudinal cutting into appropriate sections is done in block 70.

In a variation of the method, the cut bibs can then be folded up at their bottoms in a known way in block 60, as described in conjunction with FIGS. 5 and 6, to produce pockets, as described, and the edges of the pockets heat sealed, as described, in block 62. The bibs with pockets are then collected or stacked in a known way, in block 64. In this variation, it is possible to do the folding before the cutting in block 58, as the mechanism for folding is known, and then to effect the transverse cutting simultaneously with the heat sealing of the edges, or alternatively, the heat sealing of the edges and then the transverse cutting.

Figure 8A:
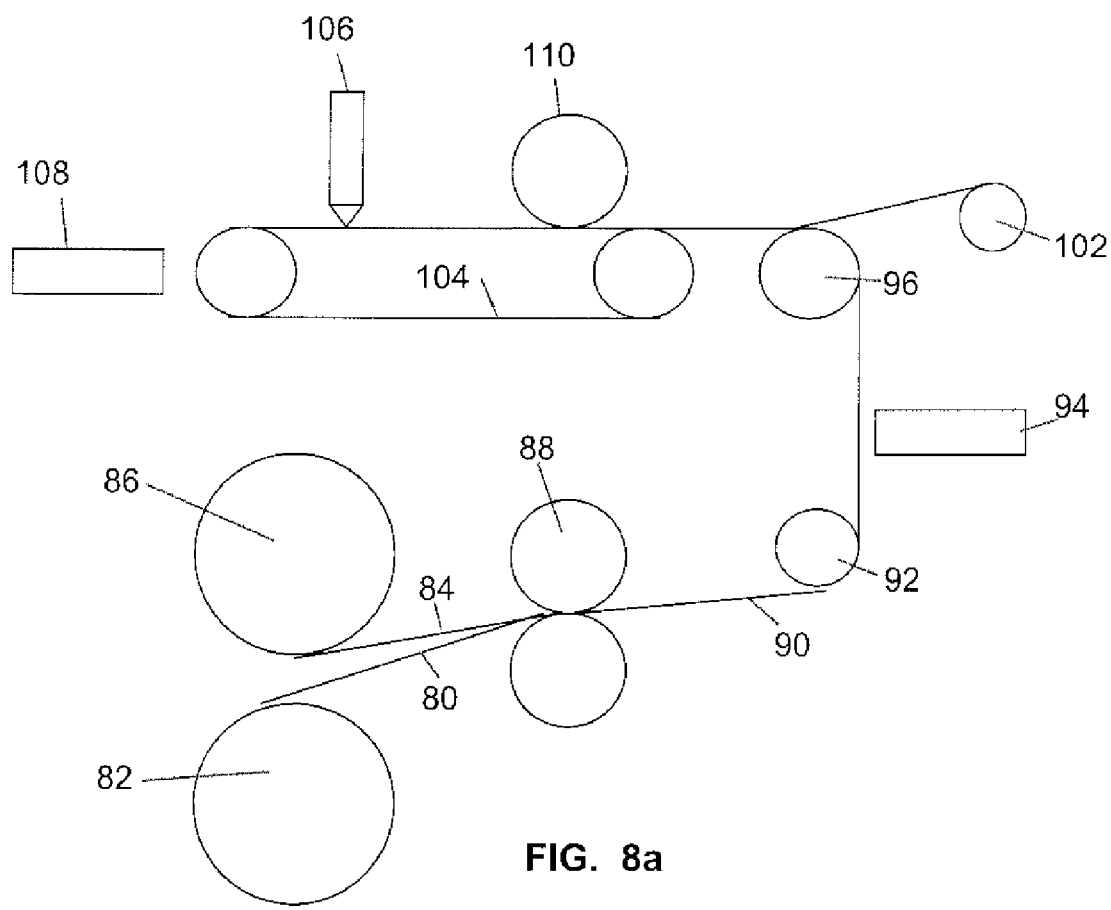
FIGS. 8a and 8b show schematically the method for making the bibs as shown in FIGS. 1 and 5.
Figure 8B:
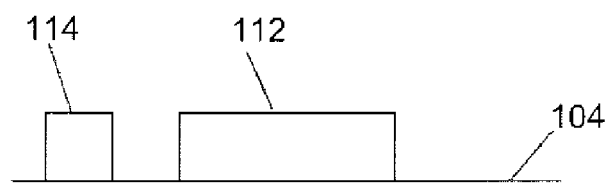
Figure 9:
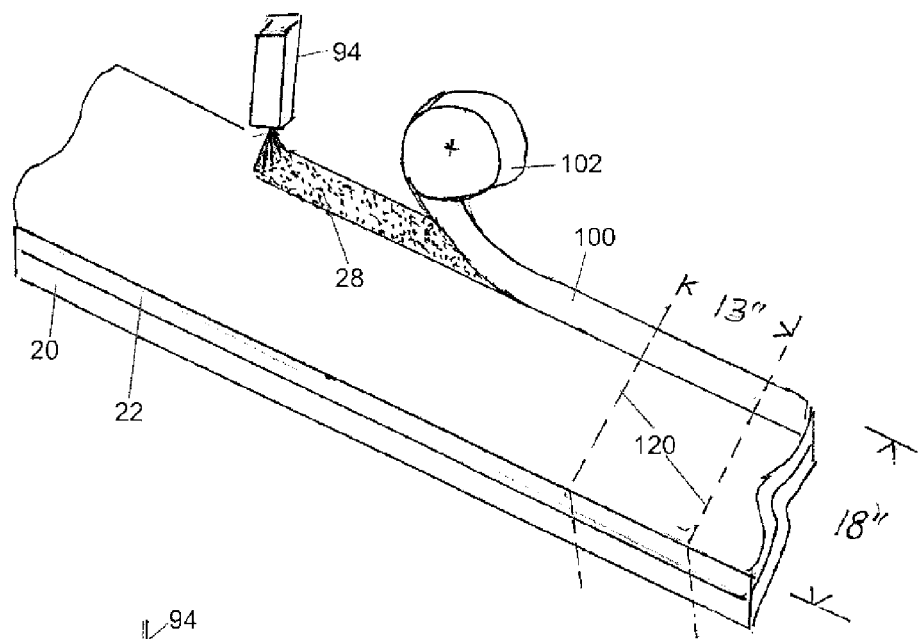
FIG. 9 show a portion of the method of making the bib of FIG. 1.

FIGS. 8*a* and 8*b* and FIG. 9 show the novel method in more detail and in a schematic manner. As shown, a web of polyethylene 80 is fed from roll of polyethylene 82, together with a web of cellular tissue paper 84 from a roll of tissue paper 86, to a laminator 88 that heat seals the paper to the polyethylene by an array of spaced rectangular depressions, or other geometry. The laminated web 90 is then turned counterclockwise 90 degrees, according to the drawing, by roll 92 to present the polyethylene side to a sprayer 94 so that suitable glue or adhesive may be sprayed onto the edge of the laminated web on the polyethylene side. Then, roll 96 turns the laminated web 90 counterclockwise 90 degrees, according to the drawing, so that the polyethylene side is facing upwardly. A suitable release tape 100 from roll 102 is then applied to the web 90 to cover the glue or adhesive. Next, the laminated web is passed onto a conveyor 104 and continued in its longitudinal direction and transversely cut, see FIG. 9 reference 120, by transverse cutter 106 at predetermined longitudinal intervals, for example, a preferred 13 inches to form the finished bibs, which are then stacked on receiving platform 108.

Figure 10:
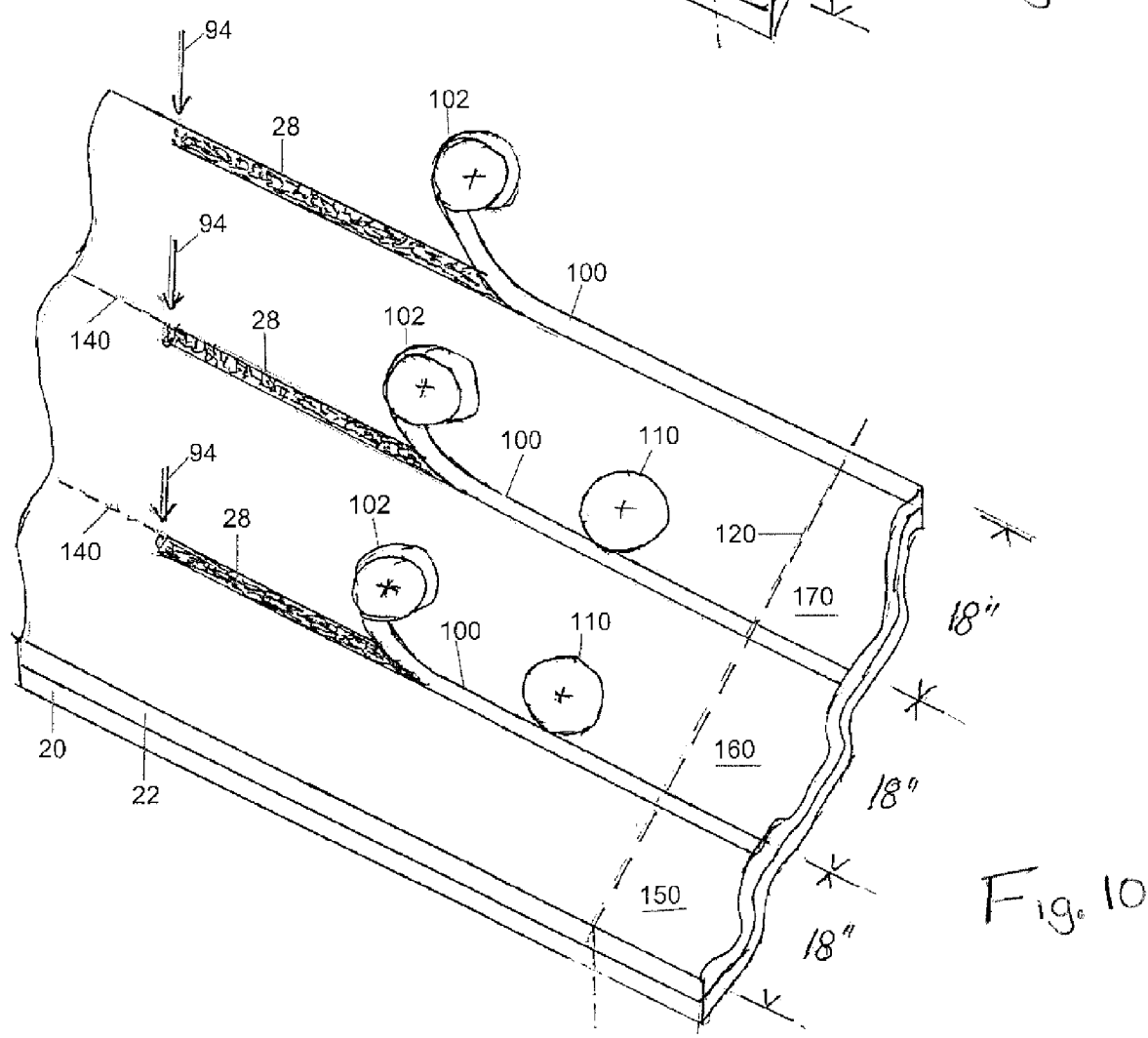
FIG. 10 shows a portion of the method of making the bib of FIG. 5.

The method shown in FIG. 8*a* can be used with webs having a predetermined width (equal to bib length), such as a preferred 18 inches, so that the finished bibs are 13 inches wide and 18 inches long. However, it is possible to use multiples of the finished length of the bibs and cut the webs longitudinally into longitudinal sections having widths that are the desired bib length. To this end, a longitudinal cutter 110 is provided to section the web into 2, 3 . . . N sections, each having a width equivalent to the finished bib length. As 18 inches is a preferred length, the web can be 36, 54, 72, etc. inches wide. FIG. 10 shows a 54 inch web that has been cut into three sections 150, 160 and 170. The longitudinal cut lines are referenced 140. The transverse cut lines are referenced 120.

As a further, improvement, the finished bibs can be provided with pockets as described with reference to FIGS. 5 and 6. To this end, a folder 112 needs to be added to the method and located either before or after the transverse cutter. Likewise, a heat sealer 114 needs to be added following the folder 112 to heat seal the edges of the pockets formed by the folding. Preferably, the heat sealing takes place before the transverse cutting. The addition of the folder 112 and the heat sealer 114 is shown in FIG. 8*b*. However, if the bibs are first cut to size and then the pockets are formed, then the heat sealing of the edges will take place after the transverse cutting.

Although the invention has been described and shown in terms of preferred embodiments, nevertheless changes and modifications will occur to those of skill in the art from knowledge of the teachings herein. Such changes and modifications are deemed to fall within the purview of the invention as expressed in the claims hereto.

What is claimed is:

1. A method of making bibs comprising the steps of
   a. laminating by embossing an elongated continuously moving web of absorbent cellular tissue paper with an elongated web of plastic film, said embossing being carried out to create an array of spaced depressions of preselected geometry in the tissue paper web while heating the plastic film, so that the array of spaced depressions in the tissue paper web are pressed into the heated plastic film and adhered to the plastic film, leaving the portions of the tissue web surrounding the array of spaced depressions unaffected and retaining their original characteristics for absorption of liquids and other foods, thereby forming a continuously moving laminated web having tissue paper on one side and plastic on the other side;
   b. continuously spraying in the direction of travel of the laminated web on the plastic film side thereof, a biocompatible adhesive to one lateral edge thereof to form a stripe of adhesive along said lateral edge of the laminated web;
   c. covering the stripe of adhesive with a release tape at a spaced downstream point in the direction of travel of the laminated web;
   d. severing the laminated web transversely at predetermined longitudinal intervals to form individual bibs; and
   e. collecting the severed individual bibs.

2. The method of claim 1 wherein the plastic film is polyethylene.

3. The method of claim 1 wherein the bibs are individuated at 13 inch intervals.

4. The method of claim 1 wherein the webs are 18 inches wide.

5. The method of claim 1 wherein the laminated web is a multiple of a predetermined bib length, and includes the further steps of cutting the laminated web into longitudinal sections of a width equal to bib length, and spraying the stripe of adhesive to the edge of each section and covering each stripe of adhesive with a release tape at a spaced downstream point in the direction of travel of the laminated web.

6. The method of claim 1 including the further steps of folding the edge of each severed individual bib opposite the edge to which the adhesive is applied, to overlie the severed individual bib and heat sealing the overlying edges of the severed individual bib to form a pocket with tissue paper on the inside to absorb drippings and plastic on the outside.

7. The method of claim 1 wherein the absorbent tissue paper is 19 gram tissue paper and the plastic film is polyethylene.

8. The method of claim 1 including imprinting the absorbent paper with a design or motif.

9. A bib comprising a sheet of laminated material composed of absorbent cellular tissue paper on one side and a plastic film on the opposite side, said tissue paper being embossed with an array of spaced depressions of preselected geometry pressed into and heat sealed to the plastic film, with the portions of the tissue paper surrounding the array of spaced depressions being free, unaffected and retaining their original characteristics for absorption of liquids and other foods, the sheet having a predetermined shape with a top edge, a bottom edge, absorbent tissue paper exposed on one side and the plastic film exposed on the other side, an adhesive received on the top edge of the plastic film side of the sheet, and a release tape covering the adhesive received on the top edge of the plastic film.

10. A bib according to claim 9 wherein the absorbent paper is imprinted with a design.

11. A bib according to claim 9 wherein the depressions are rectangular.

12. A bib according to claim 9 wherein the sheet is rectangular 13 inches wide and 18 inches long.

13. A bib according to claim 9 wherein the bottom edge of the sheet is folded over and heat sealed along its edges to form a pocket.

14. A bib according to claim 13 wherein the plastic film is polyethylene.

15. A bib according to claim 13 wherein the cellular tissue paper is on interior surfaces of the pocket.

16. A bib according to claim 15 wherein the plastic film is on exterior surfaces of the pocket.

17. A bib according to claim 16 wherein the plastic film is polyethylene.

18. A bib according to claim 13 wherein the bottom edge of the sheet is folded over such that a first section of the sheet faces a second section of the sheet with the absorbent cellular tissue paper of the first section facing the absorbent cellular tissue paper of the second section.

\* \* \* \* \*